United States Patent [19]

Isbell

[11] 4,227,579
[45] Oct. 14, 1980

[54] DIKE PRODUCING DEVICE

[75] Inventor: William C. Isbell, Petersburg, Tex.

[73] Assignees: Ken Isom; Larry Isom; Rex Isom, all of Idalou, Tex. ; part interest to each

[21] Appl. No.: 938,304

[22] Filed: Aug. 22, 1978

[51] Int. Cl.³ .............................................. A01B 13/16
[52] U.S. Cl. ........................................ 172/64; 172/90
[58] Field of Search ............................ 172/90, 488, 64

[56] References Cited
U.S. PATENT DOCUMENTS

| | | | |
|---|---|---|---|
| 1,892,002 | 12/1932 | Peacock | 172/143 |
| 2,021,343 | 11/1935 | Wetzel | 172/90 |
| 2,107,967 | 2/1938 | Taylor | 172/64 X |
| 2,193,065 | 3/1940 | Erickson | 172/64 |
| 2,362,728 | 11/1944 | Smith | 172/90 X |
| 2,494,820 | 1/1950 | Lion | 172/64 X |
| 2,837,989 | 6/1958 | Gann | 172/90 X |
| 2,852,995 | 9/1958 | Domries | 172/90 |
| 4,002,206 | 1/1977 | Eisenhardt | 172/90 |
| 4,009,759 | 3/1977 | Ernst | 172/488 X |

FOREIGN PATENT DOCUMENTS 128489  7/1948  Australia .................................... 172/90

Primary Examiner—Paul E. Shapiro
Attorney, Agent, or Firm—Clarence A. O'Brien; Harvey B. Jacobson

[57] ABSTRACT

The device consists of two longitudinally extending side frame members connected at one end to a diking plate and at the other end to a transverse frame member which in turn is connected to a hitch which allows the frame and diking plate pivotal movement in both a vertical and a horizontal plane. Connected medially of each side frame member is a pillow block bearing which bearings support, on a single axis, a pair of spoked wheels. Each of the spoked wheels has one spoke of greater length than the remaining spokes which longer spokes extend outward in a common radial plane. As the spoked wheels turn, the diking plate is lifted periodically from the ground to provide a damming action in a furrow in the earth.

4 Claims, 7 Drawing Figures

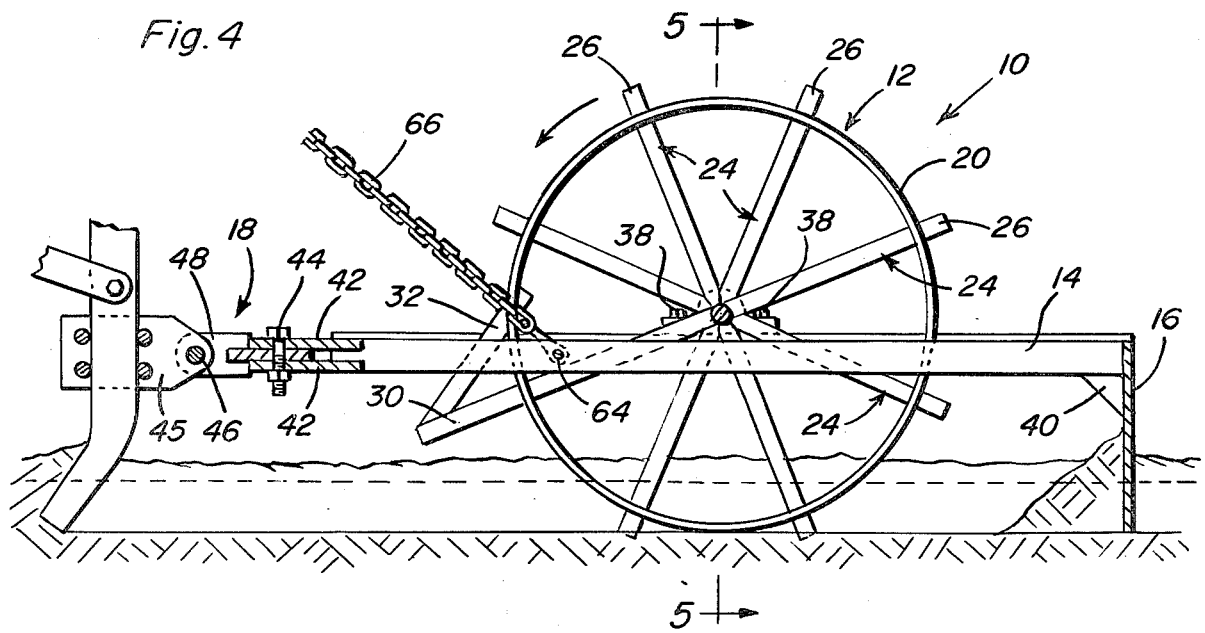
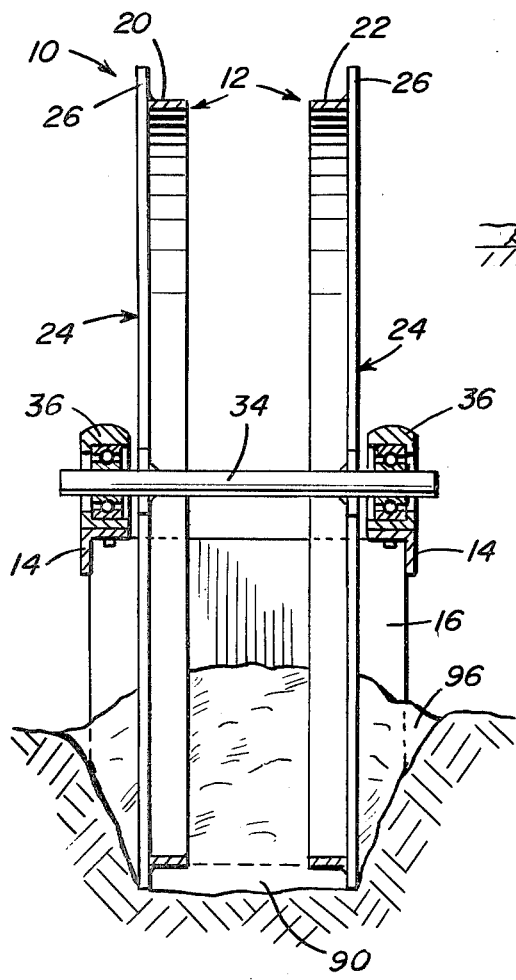
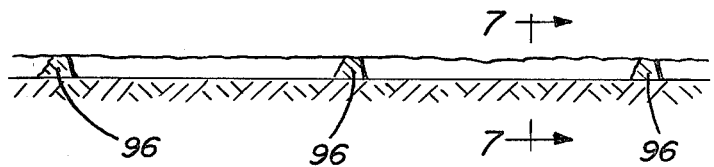
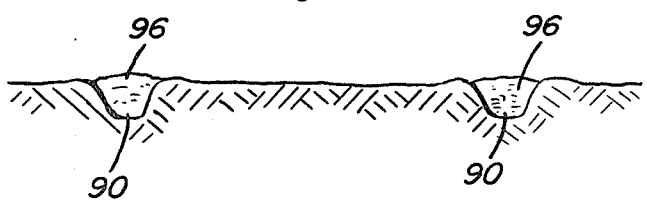

DIKE PRODUCING DEVICE

BACKGROUND OF THE INVENTION

1. Field of the Invention

This invention relates generally to implements used to form dams or dikes periodically in irrigation furrows.

2. Description of the Prior Art

It is common practice to provide for moisture and soil conservation by providing furrows or small ditches in order to capture and entrap moisture produced by rainfall and thereby direct the moisture to desired locations and also enhance the ability of the soil to absorb the moisture. With heavy rainfalls, these furrows may allow the water to run off too quickly and thereby be destroyed by erosion. Therefore, the practice has developed to provide small dams or dikes periodically along the furrow in order to impede the progress of water therethrough. The area between the dikes will collect and hold rainfall, thus allowing a longer period during which the soil is able to absorb the moisture.

Accordingly, many devices have been developed to perform the function of producing the aforementioned dams or dikes. For instance, U.S. Pat. No. 1,892,002, issued Dec. 27, 1932, to Peacock, shows a combined lister and dam forming device which includes blades located to travel in the furrows formed by the lister so as to form the desired dams. Instead of the scraper blades being intermittently lifted, means is provided for rotating a shaft to which the blades are attached, and an escapement is provided that controls this rotation. U.S. Pat. No. 2,107,967, issued Feb. 8, 1938, to Taylor, shows a dam forming attachment wherein cams attached to the wheels of the device periodically activate lever arms which are operative to effect raising of the dam forming blades thereby leaving a dam in the furrow upon each activation of the lever arm by the cam. U.S. Pat. No. 2,192,065, issued Mar. 12, 1940, to Erickson, shows a damming attachment for cultivators wherein the dam forming shovels are periodically lifted by the operation of a cam which is driven by the wheels of the device. U.S. Pat. No. 2,494,820, issued Jan. 17, 1950, to Lion, shows an irrigation ditch forming machine which includes a series of scoops and plowshares which are periodically lifted by a cam attached to the axle of the wheels of the device to form a ditch of serpentine form. U.S. Pat. No. 2,837,989, issued June 10, 1958, to Gann, shows a dam forming device which uses elongated spokes on the wheels of the device to lift a plurality of blades from the ground to form the desired dams. The blades are designed for providing dams of varying widths, depths, and shape.

SUMMARY OF THE INVENTION

The present invention provides a device whereby dams or dikes may be produced in preexisting furrows. A pair of wheels for supporting the device are spaced apart on one single axle a distance no greater than the width of the diking blade. The axle is journaled on two longitudinally extending frame members which are connected to the diking blade on one end and a hitch on the opposite end. The hitch is provided with two pivot joints to allow pivotal movement of the frame in a plane which is vertical to the ground and also in a plane horizontal to the ground. In this manner, the wheels may be disposed within a furrow and due to the pivotal movement of the hitch connection, the wheels may follow the furrow as it winds along the ground. Extended spokes are connected to each wheel and extend out in a common radial plane such that as the wheels turn, the extended spokes will lift the wheels and the diking blade about the pivot point providing motion in a vertical plane such that a dike will be left in the furrow.

An object of my invention is to provide a dike forming apparatus which is simple in construction, easy to use, and provides an effective means of disposing dikes within a winding preexisting furrow.

An additional object of my present invention is to provide a dike forming apparatus which may be easily attached directly to the shank of a digging apparatus such as a plow used to loosen the soil in the preexisting dike.

Yet a still further object of my present invention is to provide a dike forming apparatus which has a lifting chain connected thereto to lift the entire apparatus from the ground for transportation to and from the work site.

One further object of my present invention is to provide dike forming apparatus wherein the depth of the dike may be adjusted by adjusting the position of the hitch apparatus upon the towing device.

Yet even a still further object of my present invention is to provide a dike forming apparatus which apparatus is designed to operate in a single furrow and wherein a plurality of similar devices may be connected to a single towing vehicle to follow a plurality of furrows at one time.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESRIPTION OF THE DRAWINGS

FIG. 4 is an elevational sectional view of the device taken substantially along a plane passing through section line 4—4 of FIG. 2.

FIG. 5 is a front sectional view taken substantially along a plane passing through section line 5—5 of FIG. 4.

FIG. 6 is an elevational sectional view of a furrow having dikes formed therein by the dike forming device of the invention.

FIG. 7 is a sectional view taken substantially along a plane passing through section line 7—7 of FIG. 6.

DESCRIPTION OF THE PREFERRED EMBODIMENTS

Figure 1:
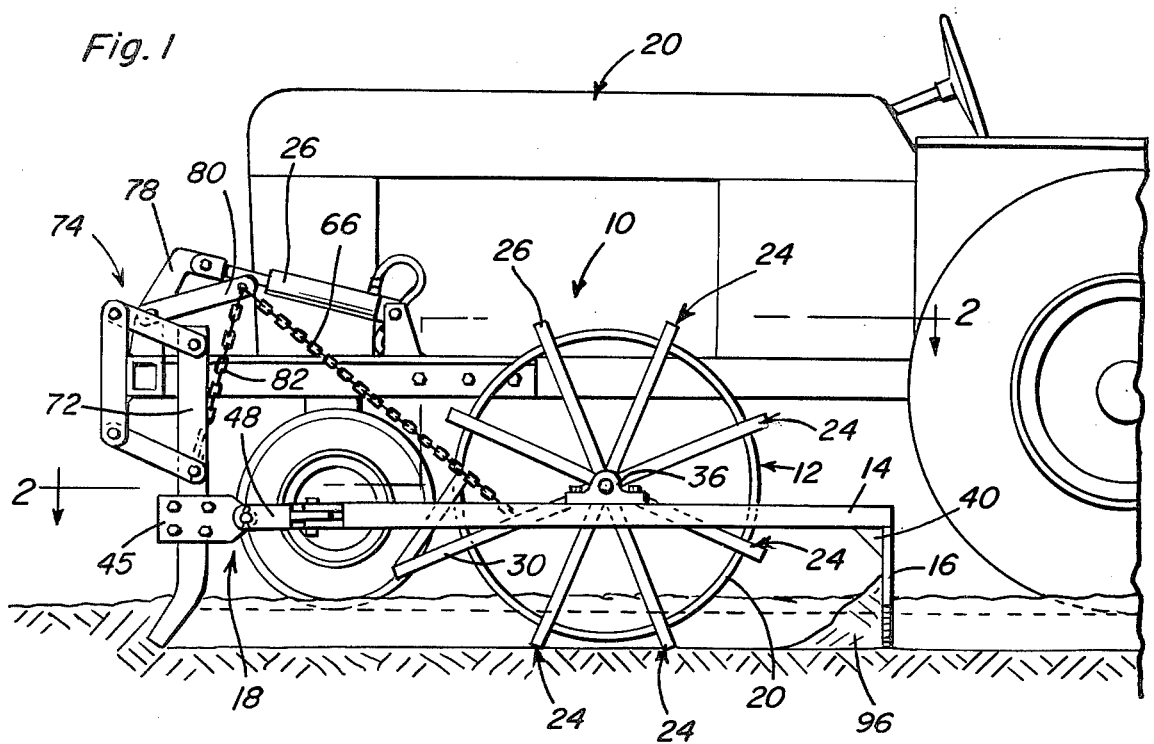
FIG. 1 is an elevational view of the dike forming apparatus as connected to the shank of a soil loosening device.
Figure 2:
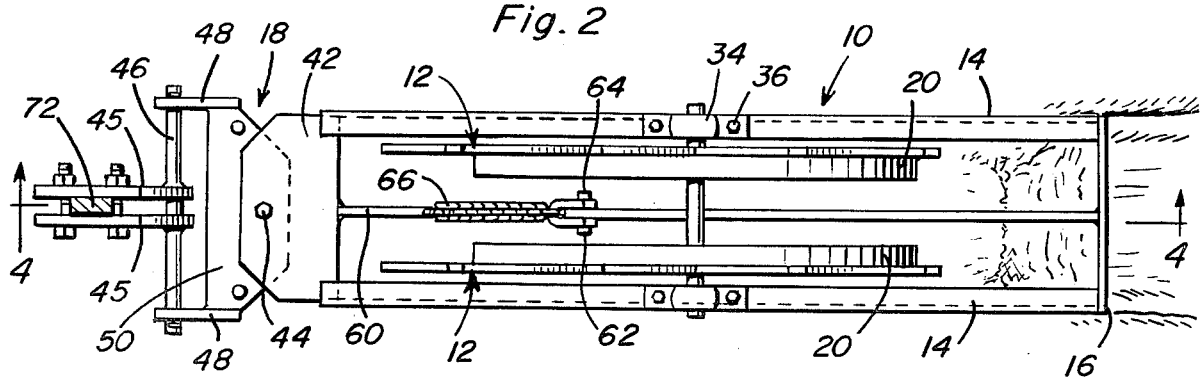
FIG. 2 is a plan sectional view of the device taken substantially alone a plane passing through section line 2—2 of FIG. 1.

Now with reference to the drawings, the dike forming device of the present invention will be described wherein the device is generally referred to by the numeral 10. The device consists of a pair of wheels 12 which support a frame defined by longitudinally extending angle bars 14 which have diking plate 16 connected to one end and a hitch 18 connected to the opposite end.

Each wheel 12 consists of a floatation band 20 formed from a strip of substantially flat metal or other suitably hard material and shaped in an annular configuration. The floatation bands are provided to keep the device from sinking into soft soil. Radially extending spokes 24 extend from the center of the wheel to a position radially outward from the floatation band and thereby form traction lugs 26 which contact the ground and may dig into the soil to provide sufficient traction to insure proper turning of each wheel 12. A sufficient number of spokes 24 should be provided to insure that at least one spoke will always be in contact with the ground. One extended dump spoke 30 is provided on each wheel in order that the wheel will follow an eccentric course along the ground when dump spoke 30 comes into contact therewith. Dump spoke 30 is also connected to floatation band 20 by means of support bar 32 which provides additional support for the dump spoke when in contact with the ground.

Each of the wheels 12 is connected to a common axle 34 such that dump spokes 30 extend outwardly in a common radial plane. The wheels may be attached to axle 34 by means of welding each spoke 24 individually to the axle or by any other suitable means. Axle 34 is journaled by pillow block bearings 36 which are connected to the longitudinally extending angle bars 14 centrally thereof, preferably, by the use of bolts 38. Diking plate 16, which is a planar, generally rectangular metal plate, is connected to the rear of angle bars 14 by means of, preferably, weld joints and is supported thereon by gussets 40. The opposite ends of the angle bars 14 are connected to a pair of vertically displaced transverse frame members 42. These plate members are again generally rectangular in shape and provide structural rigidity to the frame as well as provide a pivot axis at bolt 44 when connected to hitch 18.

Hitch 18 is composed of two laterally displaced forward connecting plates 45. The plates 45 are connected to axle 46 and pivot therewith. Axle 46 is rotatably connected to a pair of laterally displaced hitch side frame members 48. The hitch side members are in turn welded to a transverse hitch frame member 50 which is connected for pivotal movement in a horizontal plane by its disposition between the transverse frame members 42 and connection to bolt 44.

It will be understood, therefore, that with forward connecting plates 45 held fixed in vertical and lateral movement, upon contact of dump spoke 30 with the ground, the entire dike forming device 10 will pivot vertically about axle 46.

A lift bar 60 runs longitudinally of the device and is welded to diking plate 16 at one end and transverse frame member 42 at the other end. Lift bar 60 preferably comprises one solid metal bar of sufficient strength to lift the entire dike forming device. Connected centrally of the lift bar is a yoke 62 which is attached for pivotal movement to the lift bar by bolt 64. Chain 66 is attached to the yoke and may be connected on the opposite end thereof to any lifting device attached to the tow vehicle for the purpose of lifting the entire dike forming device from the ground when moving the device to or from the work site. Also, this lift chain may be employed to aid in lifting the device during the dike forming operation, if necessary.

Figure 3:
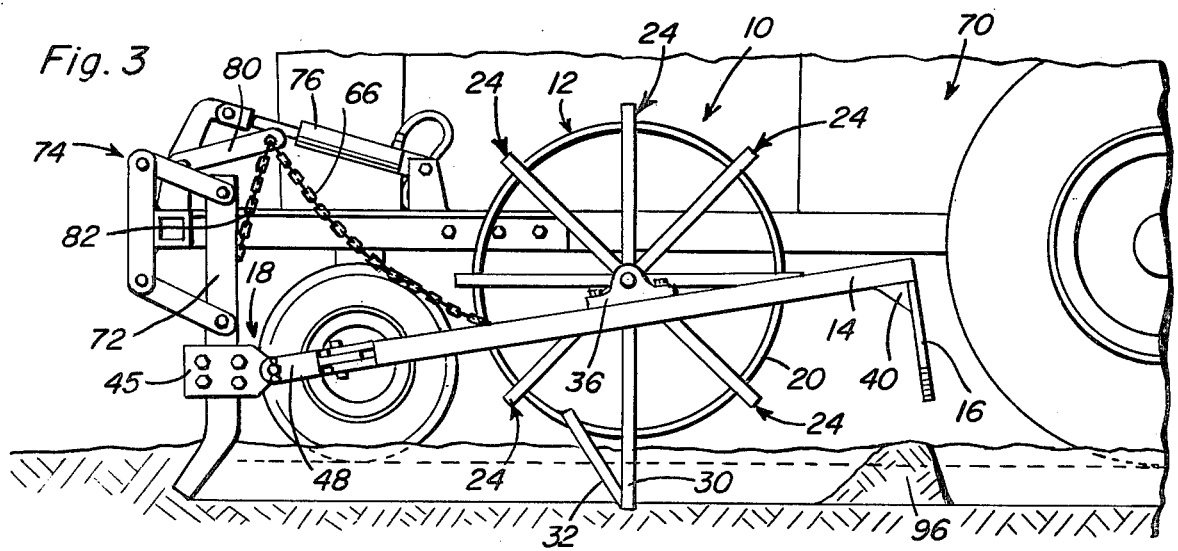
FIG. 3 is an elevational view of the device showing the lifting mechanism in operation.

The dike forming device may be connected to the tow bar of a tractor, such as shown at 70, to follow behind the tractor or hitch 18 may be connected to the shank 72 of a plow device 74, which device is connected to tractor 70. Plow device 74 is of a known construction and is used to loosen the soil in a furrow in order to facilitate the dike forming process. As shown in FIGS. 1 and 3, the plow out device is attached to the front of tractor 70 and incorporates a hydraulic cylinder 76 connected to a lever arm 78 which rotates a second lever arm 80 for lifting of the shank 72 through a chain 82. It will be seen that lift chain 66 is connected to lever arm 80 in order than upon actuation of hydraulic cylinder 76, the dike forming device will be lifted from the ground at the same time as shank 72 is raised.

The distance between the formed dikes as shown in FIG. 6 is dependent upon the diameter of wheel 12, as one dike is formed with each rotation of that wheel. Alternatively, additional dikes could be formed, if desired, by adding additional dump spokes 30 to each wheel 12. Or, occasionally, additional dikes may be formed by raising the dike forming device by the use of lift chain 66. As seen in FIG. 7, two rows of dikes are formed by the use of two dike forming devices of the invention with one device being disposed laterally on each side of tractor 70. The depth of penetration of the device into the soil may be controlled by the position of hitch 18 on the shank 72 of plow device 74. If greater penetration is desired, the hitch may be moved upward on that shank, thus disposed diking plate 16 deeper in the earth. Conversely, if the hitch 18 is lowered on shank 72, the diking plate 16 will be raised slightly with respect to the ground.

It also will be noted that with the proper attachment apparatus, as many dike forming devices as desired may be attached to a single tractor for following a plurality of furrows. In this manner, each dike forming device acts separately to follow an individual furrow and may be guided by the furrow as it follows a circuitious route along the ground. As seen in FIG. 5, the wheels 20 are positioned between angle bars 14 and are spaced from each other a distance which is less than the width of diking plate 16. In this manner, the wheels will advantageously fit within a furrow shown at 90. This feature in combination with the pivot provided at bolt 44, allowing the device freedom of pivotal motion in a horizontal plane, allows the sides of furrow 90 to guide wheels 12 in a manner whereby the dike forming device will follow the route take by the furrow 90. Thereby dikes 96 may be formed accurately in a plurality of furrows, such as shown in FIG. 7 when several of the dike forming devices are towed by a single towing vehicle, even if the furrows are not in constant parallalism with one another.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a dike forming device and a lister point comprising: a longitudinally extending frame; a plate member connected at one end of said frame; a hitch means connected to the opposite end of said frame for attaching said frame to said lister point, said hitch means including a pair of vertically oriented plates disposed adjacent opposite sides of said lister point and further including a horizontal pivot axis and a vertical pivot axis; wheel means connected to said frame for supporting said frame, said wheel means including a plurality of radially extending spokes with at least one of said spokes being longer than one other of said spokes; a cylindrical band connected on one side to each of said spokes for supporting said wheel means in soft soil, each of said spokes having a free end extending radially outward of said band; a reinforcing member connected between the outer surface of said cylindrical band and the free end of said at least one longer spoke; and bearing means supporting and journalling said wheel means on said frame.

2. The dike forming device defined in claim 1 wherein said frame comprises a pair of parallel frame members, said wheel means comprising a pair of wheels disposed between said frame members.

3. The dike forming device defined in claim 2 and further including a lifting means for lifting said device from ground engagement, said lifting means including a chain connected at the longitudinal center of said device.

4. The dike forming device defined in claim 3 and further wherein said lifting means includes a lifting bar, said lifting bar extending longitudinally of said frame between said wheels, said lifting bar being connected to said chain.

* * * * *